United States Patent [19]

Kuribayashi

[11] Patent Number: 5,507,698
[45] Date of Patent: Apr. 16, 1996

[54] PULLEY DEVICE MADE OF RESIN

[75] Inventor: Masaru Kuribayashi, Himeji, Japan

[73] Assignee: Mitsubishi Denki Kabushiki Kaisha, Tokyo, Japan

[21] Appl. No.: 385,424

[22] Filed: Feb. 8, 1995

[30] Foreign Application Priority Data

Oct. 24, 1994 [JP] Japan .................................. 6-257753

[51] Int. Cl.⁶ .................................................. F16H 55/48
[52] U.S. Cl. ............................................ 474/170; 474/177
[58] Field of Search ................................. 474/170, 174, 474/177, 178, 190; 74/89.21

[56] References Cited

U.S. PATENT DOCUMENTS

| | | | |
|---|---|---|---|
| 3,772,928 | 11/1973 | Gobeille | 474/170 |
| 4,366,609 | 1/1983 | Speer | 474/177 X |
| 4,465,161 | 8/1984 | Ohta et al. | 474/178 X |
| 4,548,592 | 10/1985 | Ohhashi et al. | 474/178 X |
| 4,589,861 | 5/1986 | Dodge | 474/178 |
| 4,652,474 | 3/1987 | Kraus | 474/190 X |
| 5,368,525 | 11/1994 | Funahashi | 474/190 |

FOREIGN PATENT DOCUMENTS

| | | |
|---|---|---|
| 2-94962 | 7/1990 | Japan . |
| 4-66452 | 6/1992 | Japan . |
| 5-22923 | 3/1993 | Japan . |

*Primary Examiner*—Roger J. Schoeppel
*Attorney, Agent, or Firm*—Sughrue, Mion, Zinn, Macpeak & Seas

[57] ABSTRACT

A pulley device formed by molding resin effectively eliminates the destruction of the main body of the pulley device by an impact from the outside, such as collision with flying foreign matter, and reduces manufacturing cost. The pulley body 6 is formed to have the high-impact strength so that the thickness of a flange portion of the pulley at the side opposite the side of a rotary machine is larger than the thickness of a flange portion at the side of the rotary machine. In consideration that foreign matter flying from the outside tend to hit and break portions of the main body 6 of the pulley device at the side opposite the side of the rotary machine whereby cracks and breakage take place in that portion, the thickness of the flange portion of the main body of the pulley device at the side opposite the rotary machine is increased to thereby improve the impact strength. Further, a shock-absorbing member or a reinforcing member is provided on the surface of the resin pulley to improve the impact strength and the anti-wearing strength.

11 Claims, 5 Drawing Sheets

FIGURE 4
FIGURE 5(a)
FIGURE 5(b)
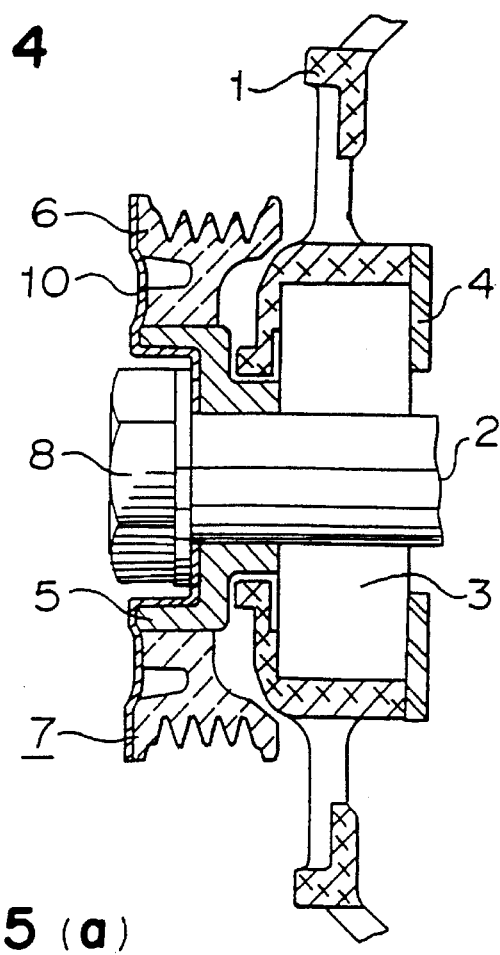
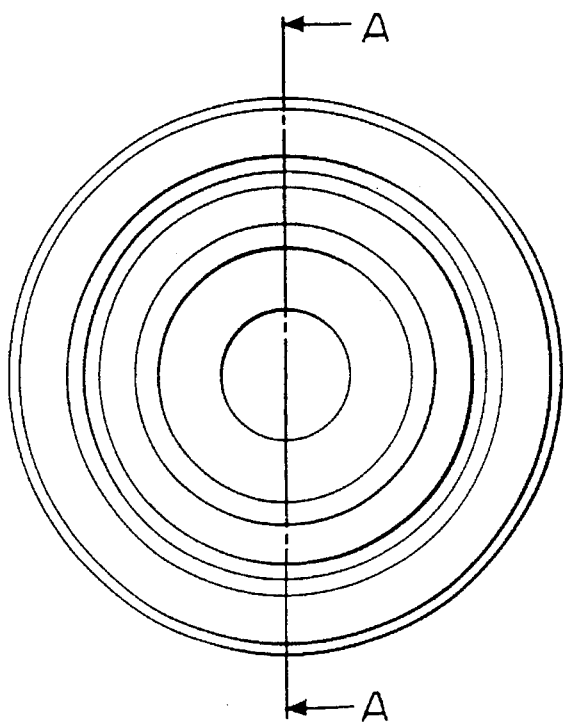
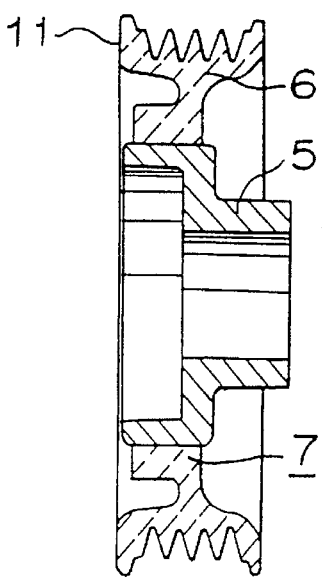

PULLEY DEVICE MADE OF RESIN

BACKGROUND OF THE INVENTION

1. Field of the Invention

The present invention relates to a pulley device made of resin which is obtainable by molding resin.

2. Discussion of Background

FIG. 10 is a diagram showing a conventional pulley device made of resin. In FIG. 10, reference numeral 1 designates a housing of a rotary machine in which a pulley device 7 made of resin is disposed. Reference numeral 2 designates a rotary shaft in a rotary machine. Numeral 3 designates a bearing in the rotary machine. Numeral 4 designates a member for supporting the bearing 3. In the conventional device, the pulley device 7 made of resin is obtained by the insert-molding of a metallic boss 5. Numeral 6 designates a pulley body made of resin. Further, the pulley device 7 made of resin is fixed to the body of rotary machine by a clamp nut 8.

The operation is explained in the following. Assuming that the pulley shown in FIG. 10 is a driven pulley, the metallic boss 5 is fixed to the rotary shaft 2 of a driven rotary machine with the clamp nut 8. Rotary motion is transmitted from a driving pulley (not shown) to the driven pulley by means of a belt (not shown) which is engaged with the pulley body 6 made of resin.

SUMMARY OF THE INVENTION

The conventional pulley device made of resin is constructed as described in the above. Therefore, when it is used for a rotary machine of an automobile, for example, foreign matter such as a small stone may jump and hit the pulley body 6 made of resin. This causes breakage or cracks in the pulley body, thereby resulting in problems such as a cut in the drive transmission belt and the breakage of the pulley.

SUMMARY OF THE INVENTION

It is an object of the present invention to solve the above-mentioned problems inherent to the prior art and to provide a pulley device made of resin having a high-impact strength, which is durable to an external impact such as hitting of a foreign matter or the like.

The present invention is to provide a pulley device made of resin, which comprises a resin pulley fixed to a rotary shaft in a rotary machine, wherein the thickness of a flange portion of the resin pulley at the side opposite the side of rotary machine is larger than the thickness at the side of rotary machine.

Also, in the present invention, a shock-absorbing member is provided on the surface of the resin pulley.

Also, in the present invention, a reinforcing member is provided on the surface of the resin pulley.

Further, the reinforcing member is formed by coating the surface of the resin pulley with a resin or metal harder than the resin which constitutes the resin pulley.

Also, the reinforcing member is a metallic plate formed to conform with the outer shape of the resin pulley which is molded in one piece with the resin pulley to cover at least a portion of the surface of the resin pulley.

Further, the shock-absorbing member or the reinforcing member is provided on the surface of a resin pulley at the side opposite the side facing a rotary machine to which the resin pulley is fixed.

The pulley device made of resin of the present invention can improve efficiently high-impact strength characteristics since the thickness of a flange at an outer side with respect to the rotary machine is increased, wherein the flange of the outer side is apt to suffer a shock by a foreign matter jumping from the outside.

Also, the resin pulley can be protected from an external shock, such as by jumping and hitting of a foreign matter since a shock-absorbing member or a reinforcing member is disposed on the surface of the resin pulley.

Further, the strength of the pulley device against high-impact can be efficiently improved since a shock-absorbing member or a reinforcing member is disposed on the pulley device at an outer portion with respect to the rotary machine which is apt to suffer an external shock such as by jumping and hitting of foreign matter.

BRIEF DESCRIPTION OF THE DRAWINGS

FIG. 4 is a cross-sectional view of a pulley device made of resin according to a third embodiment of the present invention;

FIG. 5(*a*) is a front view of a pulley device made of resin according to a fourth embodiment of the present invention;

FIG. 5(*b*) is a cross-sectional view taken along a line A—A in FIG. 5(*a*);

FIG. 6(*b*) is a cross-sectional view taken along a line B—B in FIG. 6(*a*);

FIG. 7(*b*) is a perspective view of the metallic band 12 in a formed shape;

FIG. 8(*b*) is a side view partly cross-sectioned by taking along a line C—C in FIG. 8(*a*);

DETAILED DESCRIPTION OF THE PREFERRED EMBODIMENTS

Figure 1:
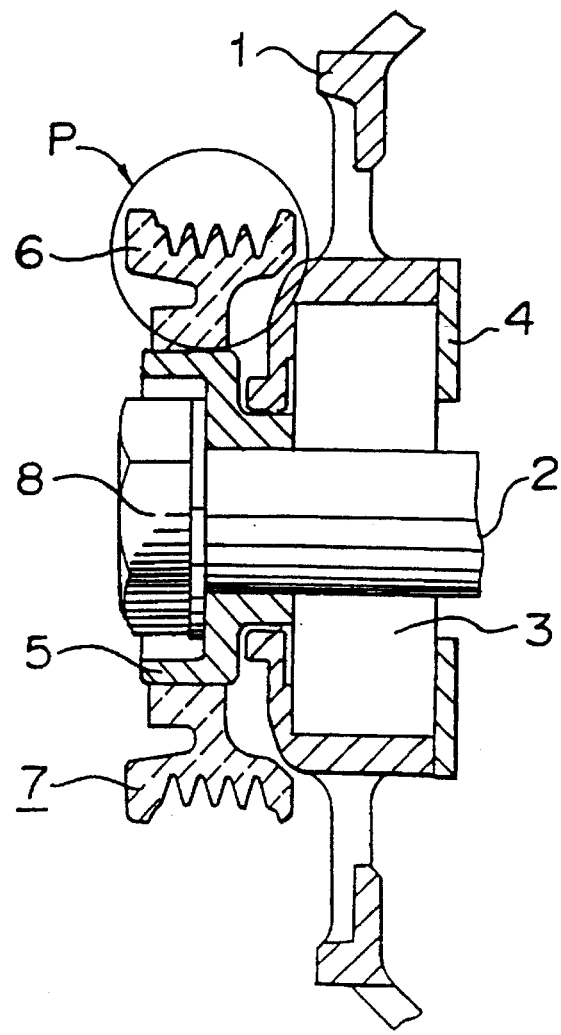
FIG. 1 is a cross-sectional view of a pulley device made of resin according to a first embodiment of the present invention.

Preferred embodiment of the present invention will be described with reference to figures wherein the same reference numerals designate the same or corresponding parts and explanation of these parts is omitted.

First Embodiment

Figure 2:
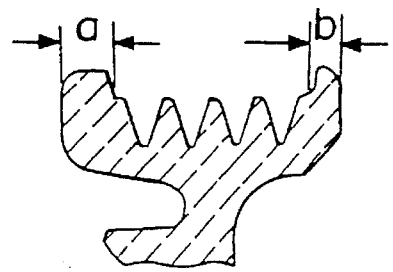
FIG. 2 is an enlarged view of an important portion of the pulley device made of resin shown in FIG. 1.

FIG. 1 is a cross-sectional view of a pulley device made of resin according to first embodiment of the present invention. FIG. 2 is an enlarged view of the portion indicated as P in FIG. 1. The pulley device is so formed that, in the main body 6 of a resin pulley fixed to a rotary machine, the thickness a of a flange portion of the main body 6 which is at the side opposite the side of the rotary machine and the thickness b of a flange portion which is at the side of the rotary machine has a relation of a>b.

In most cases, foreign matter flying toward the pulley device hit the same at the side opposite the rotary machine. Therefore, there is a necessity of minimizing an undesired result as cracks or breakage in the main body 6 of the pulley. Accordingly, the strength against a high-impact of the pulley body 6 made of resin can be improved by increasing the thickness a of the flange portion of the pulley body at the side opposite the rotary machine.

Generally, there is a method of incorporating reinforcing fibers in resin to improve the high-impact strength. However, there arise problems that glass fibers, which are widely used, induce the wearing of a belt and push up manufacturing costs.

On the other hand, the strength of the pulley device to a high impact can be improved by forming it in a suitable shape. When the diameter of the pulley device is increased, the energy of an impact or an external force can be dispersed relatively well. However, when the diameter is small, an effective way to improve the strength of a flange portion of the pulley device to an impact is to increase the thickness of the flange. It is sufficient that the portion of flange having an increased thickness is a portion having a high possibility of destruction. Namely, the thickness a of the flange portion at the side, which is most likely to be hit with foreign matters, opposite the side of rotary machine is made larger than the thickness b of the flange at the side of rotary machine. Thus, the high-impact strength was obtainable effectively without increasing cost.

Second Embodiment

Figure 3:
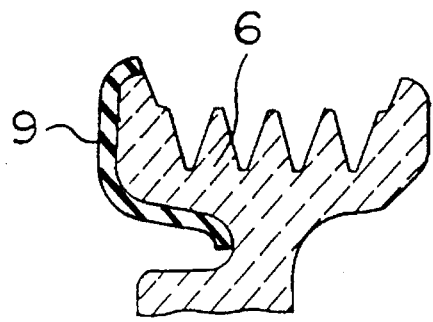
FIG. 3 is a cross-sectional view of a pulley device made of resin according to a second embodiment of the present invention.

FIG. 3 is a cross-sectional view of a pulley device made of resin according to the second embodiment of the present invention. In FIG. 3, reference numeral 6 designates a main body of the pulley device made of resin, and numeral 9 designates a shock-absorbing member 9. The shock-absorbing member 9, which is made of material having excellent impact absorbing characteristics such as rubber, is molded in one piece with or bonded to the main body 6 made of resin. Therefore, even when flying foreign matter hits it, the shock-absorbing member can receive the energy to reduce a damage to the resin portion of the pulley device. In this embodiment, since the shock absorbing member is provided at a portion having a high risk of collision with foreign matter in the same manner as the first embodiment, the manufacturing cost is not increased and destruction in the pulley device is effectively avoidable.

Third Embodiment

Further, the third embodiment of the present invention is explained with reference to FIG. 4. In FIG. 4, the pulley device made of resin 7 is obtained by insert-molding a metallic boss 5 in the main body 6 made of resin. A protecting member 10 is interposed between the metallic boss 5 and a clamp nut 8, and these elements are fixed to a rotary shaft 2. The protecting member 10 is located at the outer side of the main body of the rotary shaft where there is a high possibility of collision with extraneous matters. Thus, it serves to protect the main body of the pulley device made of resin from damage by foreign matter.

Fourth Embodiment

FIG. 5(a) is a front view of a pulley device made of resin according to the fourth embodiment of the present invention. FIG. 5(b) is a cross-sectional view taken along a line A—A of FIG. 5(a). In the figures, reference numeral 11 designates resin or a metal which is harder than the resin constituting the pulley device, and it is coating the entire surface of the main body 6 of the pulley. In this embodiment, the coated portion prevents the destruction of the main body of the pulley made of resin 6 caused by an impact from the outside, and further, improves the wearing properties.

In this embodiment, coating is provided on the entire surface of the main body 6 of the resin. However, it is clearly understood that the coating can be provided on a selected portion of possible destruction or wearing.

Fifth Embodiment

Figure 6A:
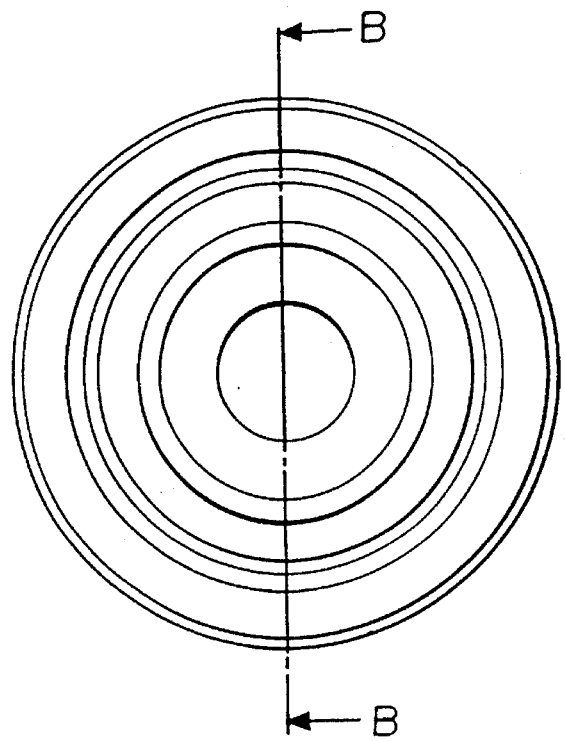
FIG. 6(*a*) is a front view of a pulley device made of resin according to a fifth embodiment of the present invention.
Figure 6B:
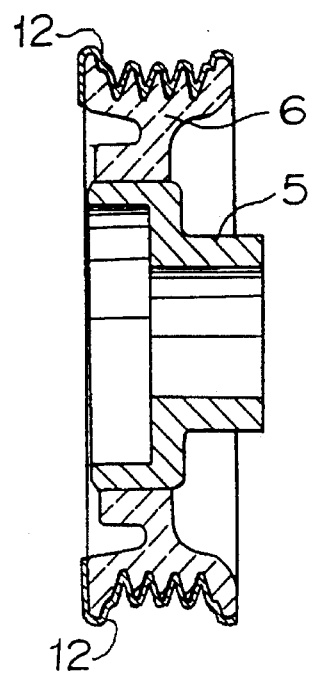

FIG. 6(a) is a front view of a pulley device made of resin according to the fifth embodiment of the present invention. FIG. 6(b) is a cross-sectional view taken along a line B—B in FIG. 6(a). In the figures, reference numeral 12 designates a metallic band formed to conform with the outer circumferential surface of the pulley device and is molded in one piece with the main body 6 made of resin in order to protect the surface with which a driving belt (not shown) is engaged and the flange portion which are apt to suffer wearing.

Figure 7A:
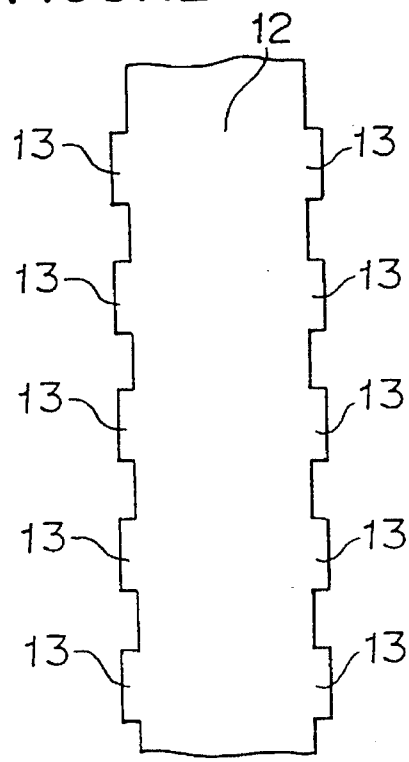
FIG. 7(*a*) is a schematic view showing a metallic band formed in a shape.
Figure 7B:
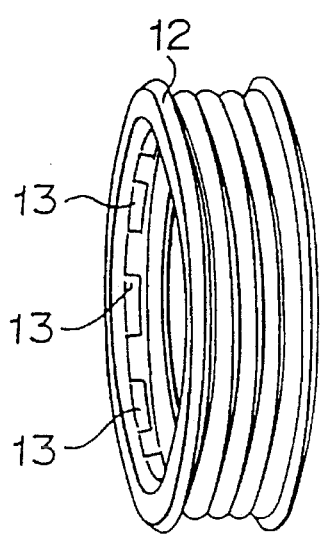

FIG. 7(a) shows a metallic band 12. FIG. 7(b) is a perspective view of the metallic band 12 formed in a shape. The metallic band has stoppers 13, which prevents rotation as shown in FIG. 7(a) and is processed to have a shape like a pulley as shown in FIG. 7(b). The metallic band is formed integrally with the main body 6 of the pulley device made of resin. In this embodiment, the high-impact strength of the pulley device made of resin was improved and, at the same time, problems such as the wearing of grooves of the pulley can be eliminated.

Sixth Embodiment

Figure 8:
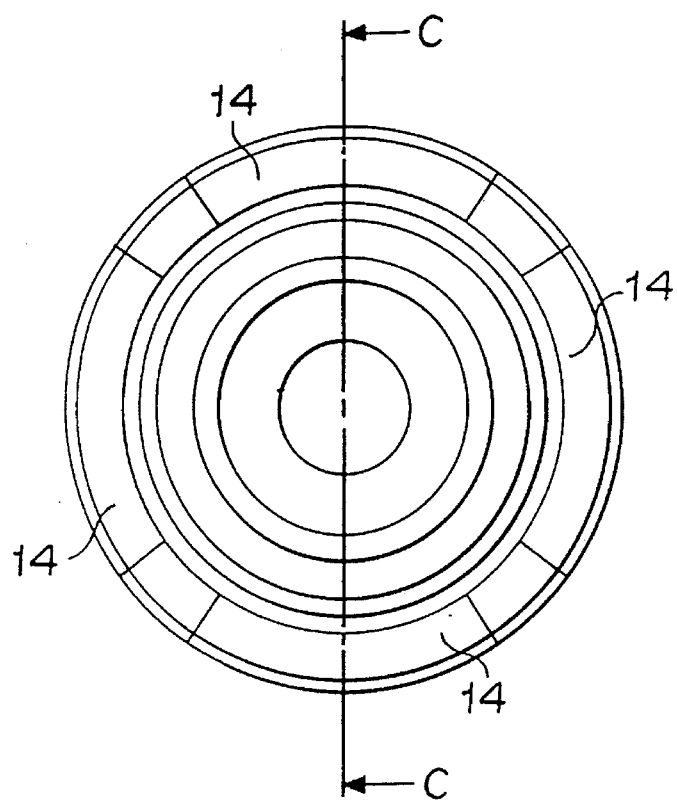
FIG. 8(*a*) is a front view of the pulley device made of resin according to a sixth embodiment of the present invention.
Figure 8:
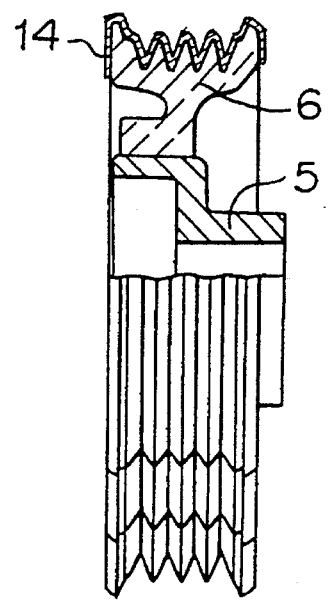
Figure 9:
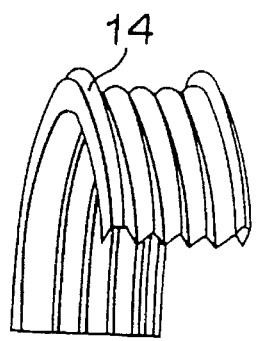
FIG. 9 is a perspective view of a part of the metallic band shown in FIG. 8.
Figure 10:
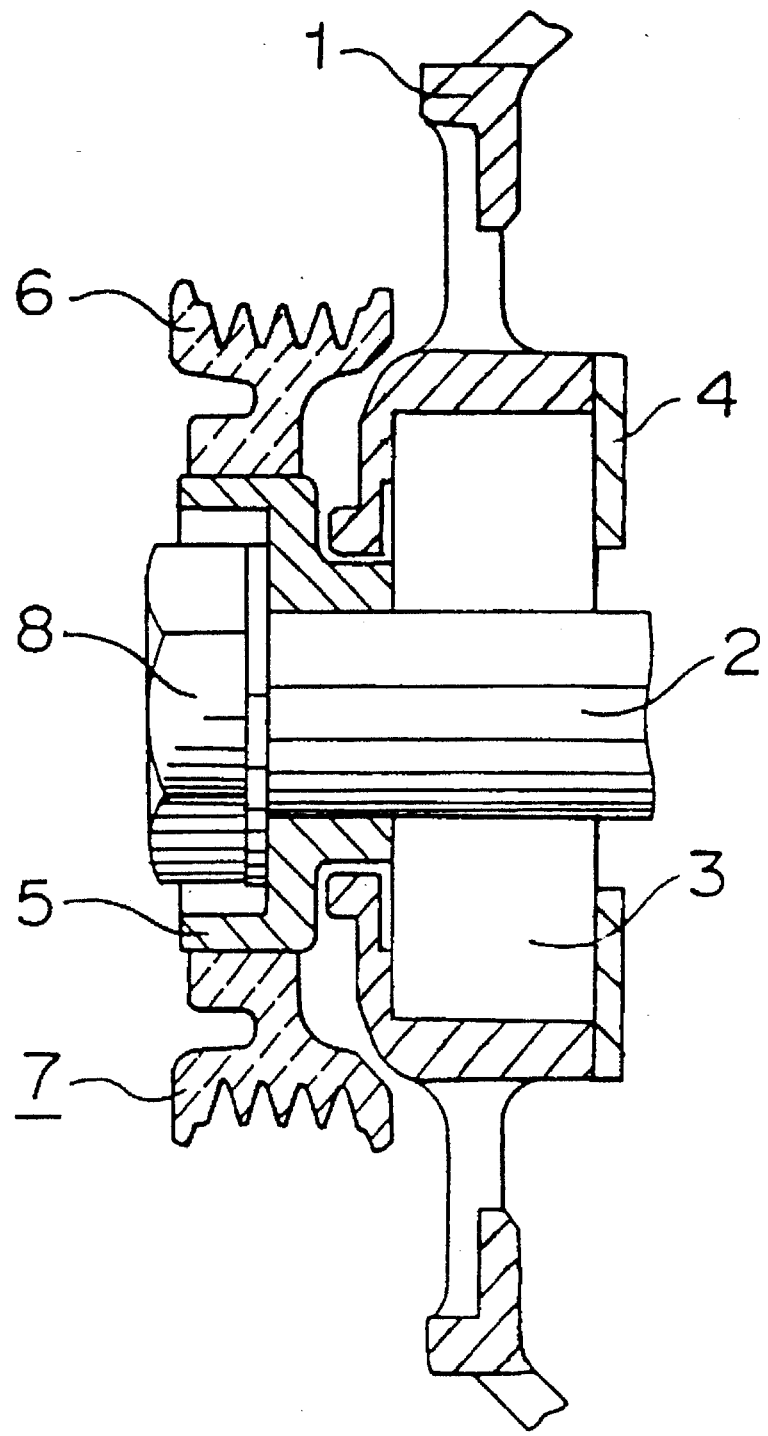
FIG. 10 is a cross-sectional view showing a conventional pulley device.

FIG. 8(a) is a front view of a pulley device made of resin according to the sixth embodiment 5 of the present invention and FIG. 8(b) is a cross-sectional view taken along a line C—C of FIG. 8(a). Metallic pieces 14 are formed to have an arc shape which corresponds to portions of the outer shape of the pulley device as shown in FIG. 9. These metallic pieces are molded integrally with the pulley 6 made of resin with intervals there between along the circumference of the pulley. The same effect as in the fifth embodiment can be obtained. Further, the stoppers can be omitted.

In accordance with the present invention, the strength of the pulley device made of resin can be effectively improved at a reduced cost, because the thickness of a flange portion of the pulley at the outside with respect to a rotary machine, which is apt to suffer a shock such as by the jumping and hitting of foreign matter, is increased.

Further, by providing a shock-absorbing member or a reinforcing member on the surface of the pulley device made of resin, the pulley device can be protected from an external shock and the wearing of the main body of the pulley can be avoided.

What is claimed is:
1. A pulley device made of resin, comprising:
a resin pulley fixed to a rotary shaft of a rotary machine, wherein a thickness (a) of a first non-grooved peripheral flange of the pulley at a side farthest from the rotary machine is greater than a thickness (b) of a second non-grooved peripheral flange of the pulley at a side closest to the rotary machine.

2. A pulley device made of resin, comprising:

a resin pulley fixed to a rotary shaft of a rotary machine, wherein a shock-absorbing member is provided on an exteriorly exposed surface of the pulley.

3. The pulley device according to claim 2, wherein the shock-absorbing member is provided on the resin pulley at a side farthest from the rotary machine.

4. A pulley device made of resin, comprising: a resin pulley fixed to a rotary shaft of a rotary machine, wherein a reinforcing member is provided on an exteriorly exposed surface of the pulley.

5. A pulley device according to claim 4, wherein said reinforcing member comprises at least one metallic band formed to conform with an outer shape of said pulley and molded in one piece so as to cover at least a portion of a surface of said pulley.

6. The pulley device according to claim 5, wherein the reinforcing member is provided on the resin pulley at a side farthest from the rotary machine.

7. The pulley device according to claim 4, wherein the reinforcing member is provided on the resin pulley at a side farthest from the rotary machine.

8. A pulley device according to claim 4, wherein said reinforcing member comprises a coating layer made of a resin harder than the resin constituting the pulley, wherein said layer is coated on a surface of said pulley.

9. The pulley device according to claim 8, wherein the reinforcing member is provided on the resin pulley at a side farthest from the rotary machine.

10. A pulley device according to claim 4, wherein said reinforcing member comprises a coating layer made of a metal harder than the resin constituting the pulley, wherein said layer is coated on a surface of said pulley.

11. The pulley device according to claim 10, wherein the reinforcing member is provided on said pulley at a side farthest from the rotary machine.

* * * * *